Jan. 11, 1966  C. V. CLIFT  3,229,108
METER-CONTROLLING SYSTEM
Filed Oct. 11, 1962
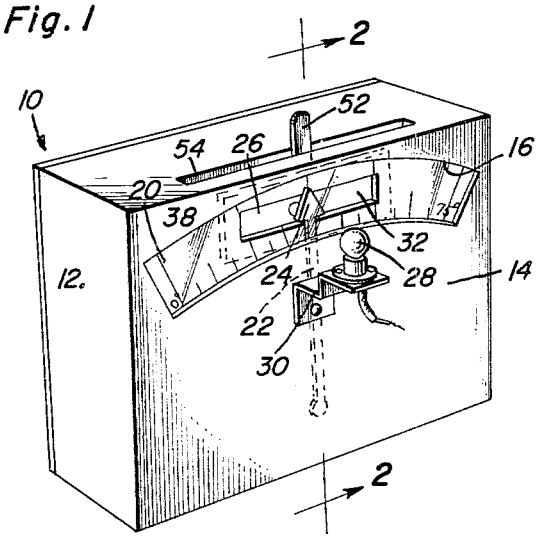
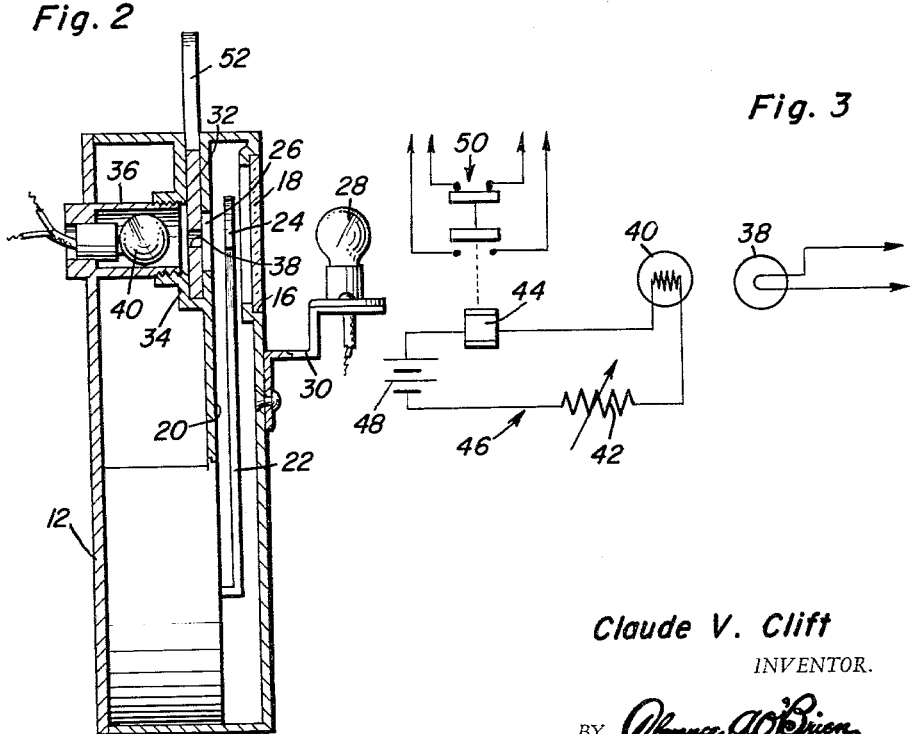
Claude V. Clift
INVENTOR.

United States Patent Office 3,229,108
Patented Jan. 11, 1966

3,229,108
METER-CONTROLLING SYSTEM
Claude V. Clift, P.O. Box 35, Hermleigh, Tex.
Filed Oct. 11, 1962, Ser. No. 229,894
4 Claims. (Cl. 250—239)

This invention relates to a controlling device for use in connection with visual indicating meters or the like.

The primary object of the present invention is to provide a control device automatically operated by an associated meter device for performing a necessary operational function without requring human supervision. The controlling device of the present invention is therefore particularly useful in connection with meters such as voltmeters, ammeters, phase meters, etc., ordinarily employed in connection with the control, regulation and maintenance of equipment such as motors and pumps. Constant attention to such meters is often required in order to prevent damage due to conditions indicated by the meter. Accordingly, the controlling device of the present invention may be useful as a power switch or some other control function in connection with the operation of the equipment.

The automatically operative controlling device of the present invention will be furthermore useful in connection with automation in general since it eliminates human supervision of the meter. Instead, the control circuit of the present invention will respond to direct illumination for energizing a relay in order to actuate a control switch. Exposure of a photo-resistive cell to illumination is therefore brought about by displacement of the meter indicator pointer itself from a preselected position on the meter dial face.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of a typical meter device and associated controlling components.

FIGURE 2 is a transverse sectional view taken substantially through a plane indicated by section line 2—2 in FIGURE 1.

FIGURE 3 is a circuit diagram of the controlling circuit.

Referring to the drawings in detail, it will be observed that the meter device 10 with which the present invention is concerned, includes an enclosure 12 within which the operative components of the meter device are mounted. The front side 14 of the meter enclosure is therefore provided with a scale reading opening 16 within which there may be mounted a protective transparent member 18 through which the scale indicia on a dial face member 20 may be viewed. The meter-controlling components housed within the meter housing 12 will therefore be operative to effect displacement of a pointer 22 so that the indicating end portion 24 thereof may move across the scale indicia on the dial face member 20. It will be appreciated, that the equipment with which the meter device 10 is associated, will have an operative condition reflected by the position of the meter indicator pointer 22 between predetermined limits.

Formed in the dial face member 20 is a window opening 26 that covers the aforementioned predetermined range of pointer movement on the scale indicia of the dial face member within which the indicating end 24 of the indicator is normally positioned. The window 26 is also exposed to illumination disposed forwardly of the dial face member as for example the illumination provided by an incandescent bulb device 28 mounted by the bracket element 30 on the front wall 14 of the meter device. The bulb device 28 may therefore be supplied with A.C. or D.C. current for energization thereof. It will however be observed, that the illumination is blocked by means of a rigid adjustable slide member 32 slidably mounted rearwardly of the window 26 within the meter enclosure 12.

The illumination blocking slide member 32 is slidably mounted by a light-confining structure including the slide mounting formation 34 projecting rearwardly from the dial face member 20 and which threadedly receives a tubular mounting element 36. The slide member 32 has formed therein an aperture 38 which may be adjustably positioned for exposure through the window 32 whereby illumination may enter the light-confining tubular member 36 at some desired adjusted position, whereby displacement of the meter indicator pointer 22 from a preselected position will permit light rays from the illuminating bulb device 28 to enter the tubular member 36. Mounted within the tubular member 36, is a photo-resistive device 40, the electrical resistivity of which is reduced to an operatively low value when the device 40 receives light radiation.

It will be observed from FIGURE 3 in particular, that the photo-resistive device 40 is connected in series with an adjustable sensitivity resistor 42, and in series with a relay coil 44 of the control circuit 46 energized by a suitable source of potential 48. It will therefore be appreciated, that when the photo-resistive device 40 is subjected to direct illumination, the reduction in its resistivity is adjusted to produce an energizing current flow through the relay coil 40 thereby actuating the relay switch mechanism 50 through which various control functions may be performed such as power control functions, alerting alarms, etc.

From the foregoing description, the operation and utility of the meter-controlled control device, will be apparent. The device may be utilized by observing the normal desired position of the meter indicator pointer and adjusting the position of the slide member 32 by means of the selector arm 52 which is connected to the slide member and projects upwardly from the meter enclosure through the slot 54. Thus, the aperture 38 may be positioned in blocking relation behind the indicating end 24 of the indicator pointer itself so that when the illuminating bulb 28 is energized, it will not affect the relatively high resistivity of the photo-resistive device 40 enclosed within the light-confining structure. Should the operating condition of the associated equipment being metered deviate sufficiently to require either attention or performance of some control function, the indicator 22 will have been displaced sufficiently so as to expose the aperture 38 through the window 26 in the dial face member 20. The illuminating device will thereby illuminate the chamber within the light-confining structure through the aperture 38 so that the photo-resistive cell 40 may respond by reducing the electrical resistivity thereof to a value sufficient to produce an energizing current in the control circuit 46. The control relay coil 44 will therefore become energized so as to actuate the control switch 50 for the purposes hereinbefore indicated.

The foregoing is considered illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a meter having a dial face and an indicator movable in front of the dial face, a control device comprising, a light admitting window formed on said dial face disposed rearward of the indicator path of movement, adjustable light blocking means having an aperture disposed rearwardly of the window on the dial face and for exposure to light admitted through said window, light confining means connected to said dial face and projecting rearwardly therefrom for slidably mounting said adjustable means, photo-resistive means mounted within said light confining means in closely spaced adjacency to said adjustable means for reduction in electrical resistivity when directly exposed to illumination admitted through said aperture, and illumination means fixedly mounted forwardly of the dial face for exposing said photo-resistive means to illumination when the indicator is displaced out of alignment with said aperture.

2. The combination of claim 1, wherein said light confining means comprises a tubular member within which the photo-resistive means is located in alignment with the window for said direct exposure to said illumination.

3. The combination of claim 1, wherein said adjustable means comprises, a rigid slidable member disposed within the light confining means to block the window, and a selector element connected to the slidable member projecting from the light confining means for selective displacement of the slidable member and the aperture formed therein to change the light blocking position of the indicator.

4. In combination with an instrument having a dial face and a traversing pointer, a control device comprising, guide means mounted on the dial face rearwardly of the path of travel of said pointer, a tubular member secured to said guide means rearwardly spaced from the dial face, an elongated window formed in said dial face along a portion of said path of travel and in alignment with the tubular member, a light blocking member mounted in said guide means between the window and the tubular member having an aperture through which illumination is transmitted, selector means connected to the light blocking member and projecting upwardly from the dial face for positioning the aperture along said path of travel of the pointer corresponding to a selected position on the dial face, photo-sensitive means mounted in said tubular member for direct exposure to illumination admitted through said aperture and illumination means fixedly mounted forwardly of the pointer aligned with said path of travel for establishing a source of illumination to which the photo-sensitive means is exposed except when blocked by the pointer at said selected position on the dial face.

References Cited by the Examiner

UNITED STATES PATENTS

| 2,164,114 | 6/1939 | Kolb | 250—231 |
| 2,337,535 | 12/1943 | Acs | 317—124 XR |
| 2,948,799 | 8/1960 | Weise | 317—124 |
| 3,010,026 | 11/1961 | Schake | 317—124 XR |

SAMUEL BERNSTEIN, *Primary Examiner.*